Sept. 14, 1965 A. BRENNER 3,205,777
TELESCOPIC MOUNTING FOR CONVEX MIRRORS
Filed Nov. 8, 1961 2 Sheets-Sheet 1
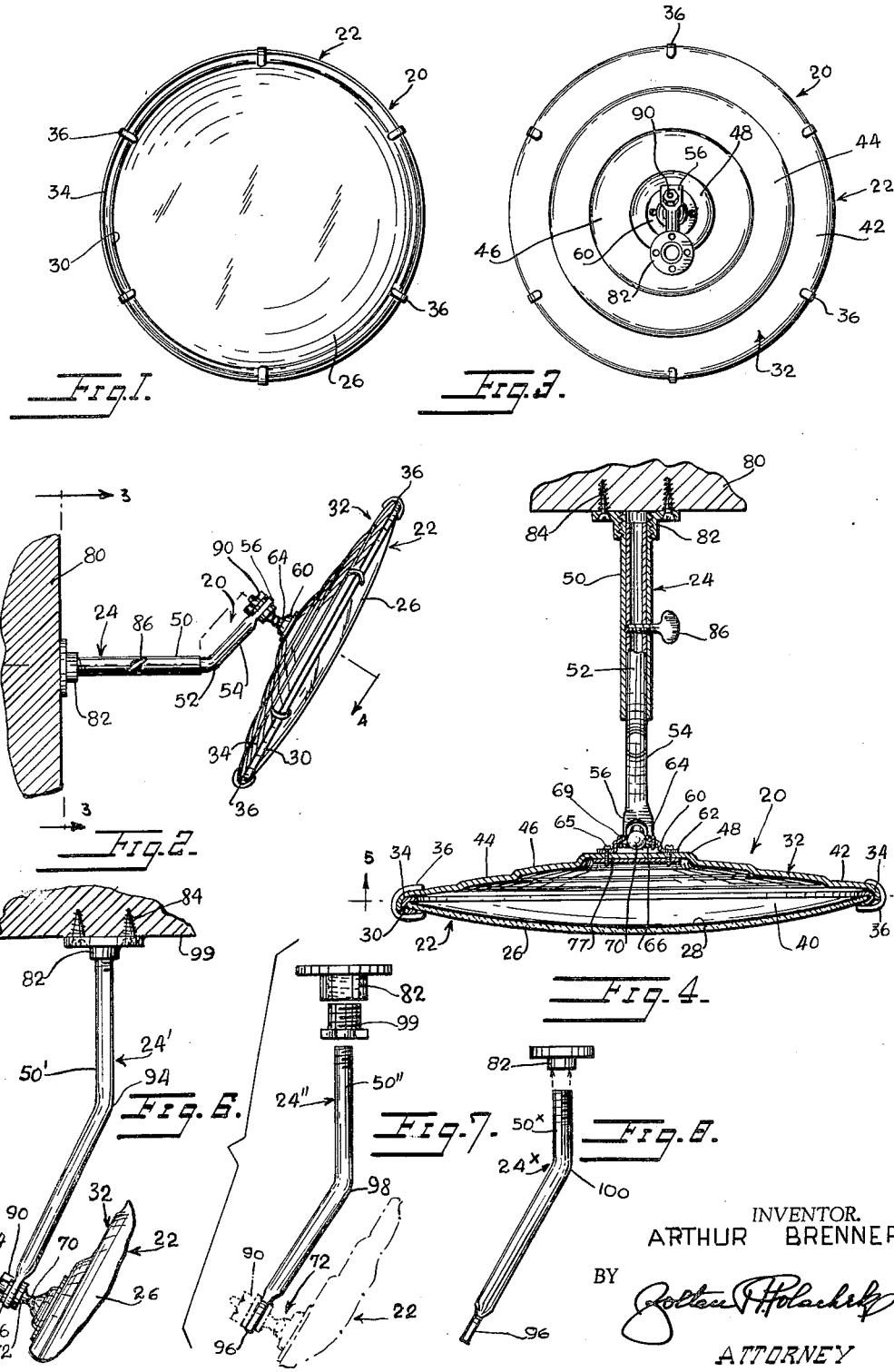
INVENTOR.
ARTHUR BRENNER
BY
ATTORNEY Sept. 14, 1965  A. BRENNER  3,205,777
TELESCOPIC MOUNTING FOR CONVEX MIRRORS
Filed Nov. 8. 1961  2 Sheets-Sheet 2

INVENTOR.
ARTHUR BRENNER
BY
ATTORNEY

United States Patent Office 3,205,777
Patented Sept. 14, 1965

3,205,777
TELESCOPIC MOUNTING FOR CONVEX
MIRRORS
Arthur Brenner, 1328 Flatbush Ave., Brooklyn, N.Y.
Filed Nov. 8, 1961, Ser. No. 151,016
1 Claim. (Cl. 88—97)

This invention relates generally to mirrors and more particularly to a mirror construction and mounting therefor.

It is often found desirable to mount a mirror in a store, compartment, public hall and the like for inspection of a large area of the enclosure. This presents difficulties and problems as to the most advantageous place to position the mirror and as to the most desirable shape of the mirror in order to scan the largest area. The ability of the mirror construction to withstand all sorts and kinds of atmospheric conditions must also be considered as well as protection of the silvered back of the mirror.

The principal object of the invention is to provide a mirror construction with a curved reflecting surface.

A further object of the invention is to provide a mirror construction with a backing member for the mirror that is formed of stepped concentric sections.

A further object of the invention is to provide a mirror construction with adapter means whereby the mirror construction may be attached to a mounting bracket removably secured to a socket on the side wall, ceiling or floor of the enclosure.

Still another object is to provide a mounting bracket for a mirror whereby the mirror may be adjusted to various angles and the mirror is inherently firm in the interval between adjustments.

For further comprehension of the invention, and of the objects and advantages thereof, reference will be had to the following description and accompanying drawings, and to the appended claim in which the various novel features of the invention are more particularly set forth.

In the accompanying drawings forming a material part of this disclosure:

FIG. 1 is a front elevational view of a mirror construction and mounting bracket embodying one form of my invention.

FIG. 2 is a side elevational view thereof shown supported on a side wall, the mirror construction being shown in tilted condition.

FIG. 3 is a rear elevational view as seen from the line 3—3 of FIG. 2.

FIG. 4 is a sectional view taken on the line 4—4 of FIG. 2.

FIG. 6 is a side elevational view showing a modified form of mounting bracket for mounting the mirror on a ceiling and showing a fragment of a mirror mounted thereon.

FIG. 7 is a similar view of another modified form of mounting bracket for the mirror construction, the mirror construction and socket being shown in dot-dash lines.

FIG. 8 is a view similar to FIG. 6 showing still another modified form of mounting bracket, the bracket and socket being detached and the mirror being omitted.

Figure 5:
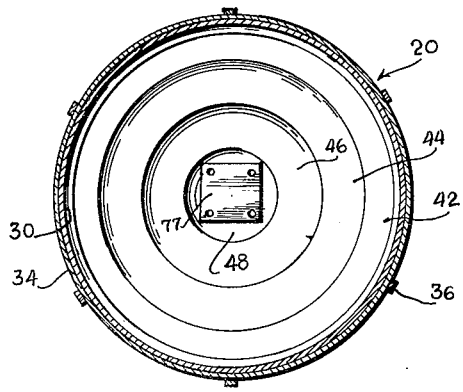
FIG. 5 is a sectional view taken on the line 5—5 of FIG. 4.

Referring in detail to the drawings, in FIGS. 1 to 5, inclusive, a preferred form of combined mirror construction and mounting bracket unit is shown and designated generally by the reference numeral 20. The mirror construction and mounting bracket unit 20 includes a mirror construction 22 and mounting bracket unit 24.

The mirror construction 22 comprises a curved, convex or "panoramic" circular glass body 26, which may be of any desired size and which is provided with a silver reflective surface 28 on the rear side thereof. The peripheral edge of the glass body 26 is embraced by a plastic band 30, embracing both sides of the edge. The glass body 26 and band 30 are supported within a metal casing 32 by means of a flange 34 which is formed on the periphery of the casing and which engages the band 30 and holds the glass body 26 in place. A series of spaced metal straps 36 fasten the casing and band 30 against displacement.

It will be noted from FIG. 4, that by reason of the curved form of the glass body 26 and the curved character of the casing of backing member 32, a space or chamber 40 is provided between the glass body and backing member. The sections are slightly concavo-convex in shape. Such a construction and arrangement contributes materially to the ease with which the casing or backing member 32 may flex in a manner to readily absorb any stresses or strains.

This construction and arrangement of the concentric stepped sections in the backing member 32 also compensates for the relatively different coefficients of expansion and contraction in the material of which the mirror and backing member are constructed, thereby eliminating the probability of relative movement of portions of the mirror and backing member.

The mounting bracket unit 24 comprises a straight outer tubular member or pipe 50 having one end threaded and comprises another inner tubular member or pipe 52 slidably fitted in the outer pipe 50. The end 54 of the pipe 52 protruding from the pipe 50 is bent and terminates in a flattened portion 56 formed with a central hole.

A shallow dish-shaped circular plate 60 serves as a bearing unit for a universal joint connection. Plate 60 is formed with a radial peripheral flange 62 having spaced holes therearound to receive screws 65 extending through the flanged holes in section 48 of the backing member 32. Plate 60 is also formed with a central circular opening around which is a slightly curved upstanding flange 64. Adjacent the central opening, the plate is formed with spaced holes. Inside the body of the plate 60 there is another washer-type plate 66 formed with spaced holes aligned with the spaced holes in plate 60 and is further formed with a central opening in line with the central opening in plate 60. A slightly curved downwardly extending flange 68 is formed around the opening in plate 66. Screws 69 extending through the aligned holes in the plates 60 and 66 fasten the plate 66 in place. The upper and lower flanges 64 and 68 constitute seats for a ball 70 formed at one end of a ball joint stud 72, the other end of the stud being reduced in diameter and threaded as indicated at 74, an annular flange 76 being formed midway the ends of the stud. A reinforcing plate 77 is positioned under section 48 of backing member 32 and is secured by the screws 65.

In mounting the combined mirror construction and mounting bracket unit 20 on a support such as the side wall 80 shown in FIG. 2, a flanged and internally threaded socket 82 is secured to the wall by means of screws 84 passing through holes in the flange of the socket and into the wall. The outer tubular member of pipe 50 of the mounting bracket unit is threaded into the body of the socket as shown in FIG. 4 and the inner tubular member or pipe 52 is inserted into the pipe 50. A setscrew 86 extending through aligned openings in the pipe 50 and tubular member 52 holds the tubular members in fixed telescopic relation. The mirror construction 22 may then be attached to the mounting bracket unit by slipping the threaded end 74 of the ball joint stud 72 through the hole in the flattened end 56 of the bent end of the inner tubular member 52 and threading a nut 90 on the protruding end 74 of the stud. The mirror construction 22 may then be tilted to any desired angle relative to the vertical plane.

In FIGS. 6, 7 and 8, modified forms of mounting brackets for supporting large and heavy mirror constructions are shown. In the modified form of mounting bracket 24' shown in FIG. 6, a single elongated tubular member or pipe 50' is threaded into the socket 82. The pipe 50' is bent at its center, midway its ends as indicated at 94, terminating in a flattened portion 96 provided with a central hole to receive the threaded end 74 of the stud 72 for attaching the mirror construction 22. This form is used for mounting large and heavy types of mirror constructions on overhead supports such as a ceiling 99.

The modified form of mounting bracket 24" shown in FIG. 7 differs from the form 24' of FIG. 6 in that the body of the tubular member or pipe 50" is shorter with a bend 98 midway its ends. A flanged sleeve 99 is interposed between the body portion and the socket 82 and serves as a reducer or adapter. Smaller types of mirrors are supported by the pipe 50".

In FIG. 8, the modified form of mounting bracket 24ˣ shown differs from both the forms 24' and 24" in that the body 50ˣ is shorter than both with a bend 100 midway its ends. This bracket supports mirrors of light weight.

Figure 9:
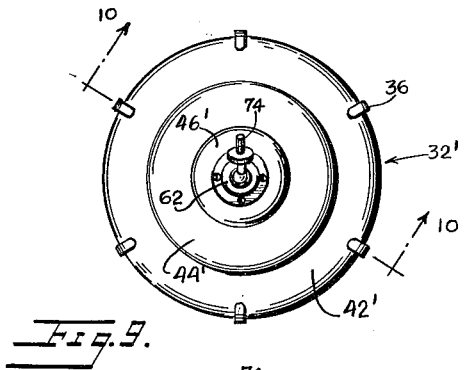
FIG. 9 is a rear elevational view of another modified form of rear backing member on a smaller scale.
Figure 10:
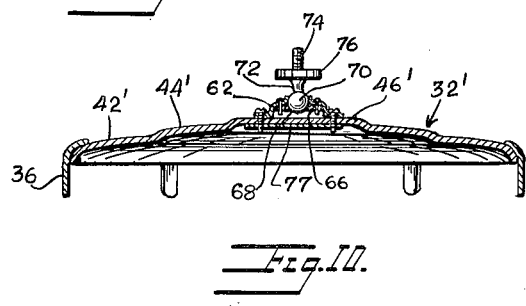
FIG. 10 is an enlarged cross-sectional view taken on the line 10—10 of FIG. 9.

In FIGS. 9 and 10, a modified form of casing or backing member 32' is shown. Backing member 32' differs from the backing member 32 shown in FIGS. 1 to 6 merely in the number of annular stepped sections forming the body of the casing. In backing member 32' only three concentric annular sections 42', 44' and 46' compose the body of the backing member.

Figure 11:
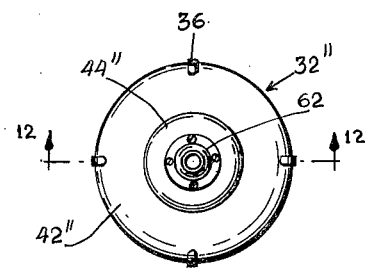
FIG. 11 is a rear elevational view of yet another modified form of rear backing member on a still smaller scale.
Figure 12:
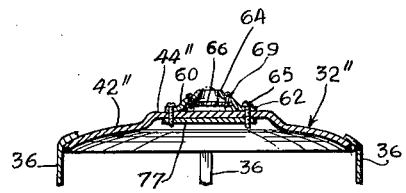
FIG. 12 is a cross-sectional view taken on the line 12—12 of FIG. 11.

In the modified form of casing or backing member 32" shown in FIGS. 11 and 12, only two concentric annular sections 42" and 44" compose the body of the casing or backing member.

Figure 13:
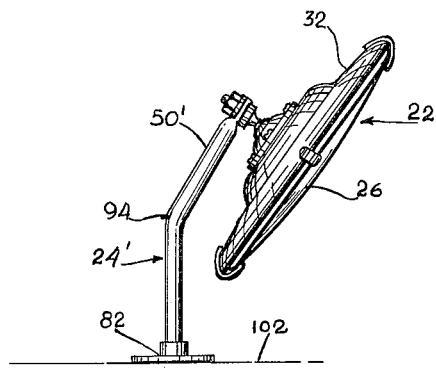
FIG. 13 is a side elevational view of a mirror construction embodying the rear backing member of FIG. 11 shown mounted on a horizontal supporting surface such as a floor.
Figure 14:
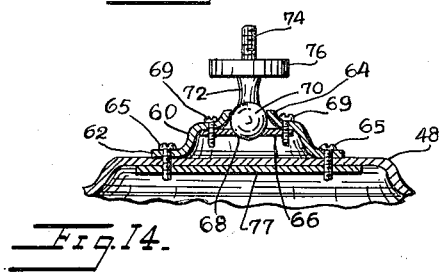
FIG. 14 is an enlarged fragmentary detail view of the ball joint arrangement shown in FIGS. 4 and 10.

FIG. 13 illustrates the combined mounting unit and mirror construction mounted on a horizontal surface such as a floor 102. Herein the socket 82 is fastened to the floor with its socket opening upwardly. The mounting bracket such as the bracket 24" shown in FIG. 6 is threaded into the socket whereby the mirror construction 22 may be supported at an angle to the vertical plane.

While I have illustrated and described the preferred embodiments of my invention, it is to be understood that I do not limit myself to the precise constructions herein disclosed and that various changes and modifications may be made within the scope of the invention as defined in the appended claim.

Having thus described my invention, what I claim as new, and desire to secure by United States Letters Patent is:

A combined mirror construction and mounting bracket unit comprising in combination, a circular mirror, an annular band embracing the peripheral edge of the mirror, a circular slightly curved plate backing member for the mirror having a laterally extending annular flange surrounding the edge, said plate backing member having concentric annular sections slightly curved and extending outwardly and convexly progressively from the periphery to the center of the plate backing member, a dish-shaped bearing plate secured to the outer central portion of the plate backing member, said dish-shaped plate having a central opening, a plate enclosed in the dish-shaped plate below the central opening therein, said enclosed plate having a central opening, a ball joint stud having a ball on one end thereof extending through the central openings in the plates, said ball being seated on the edges of the central openings, the other end of the stud being reduced in diameter and threaded, a bracket unit having a pair of telescopic tubular members, the outer end of the inner of said tubular members removably attached to the threaded end of the ball joint stud, one end of the outer of said tubular members threaded in a threaded socket secured to a supporting surface, and metal straps across the flange on the curved backing member and the annular band whereby said mirror is secured in fixed position in front of said backing member.

References Cited by the Examiner

UNITED STATES PATENTS

| | | | |
|---|---|---|---|
| 812,660 | 2/06 | Lovegrove. | |
| 1,071,725 | 9/13 | Franks. | |
| 2,186,643 | 1/40 | Kaplan. | |
| 2,187,582 | 1/40 | Anderson | 88—96 |
| 2,579,148 | 12/51 | Jones | 88—96 |
| 2,706,931 | 4/55 | Morgenstern | 88—96 X |
| 2,789,464 | 4/57 | Williams | 88—96 X |
| 2,806,135 | 9/57 | Bosley | 88—73 X |
| 2,882,793 | 4/59 | Petri et al. | 88—97 X |
| 2,978,078 | 4/61 | Waller et al. | 88—96 X |
| 3,005,385 | 10/61 | Meade et al. | 88—97 X |

JEWELL H. PEDERSEN, *Primary Examiner.*